Patented July 7, 1931

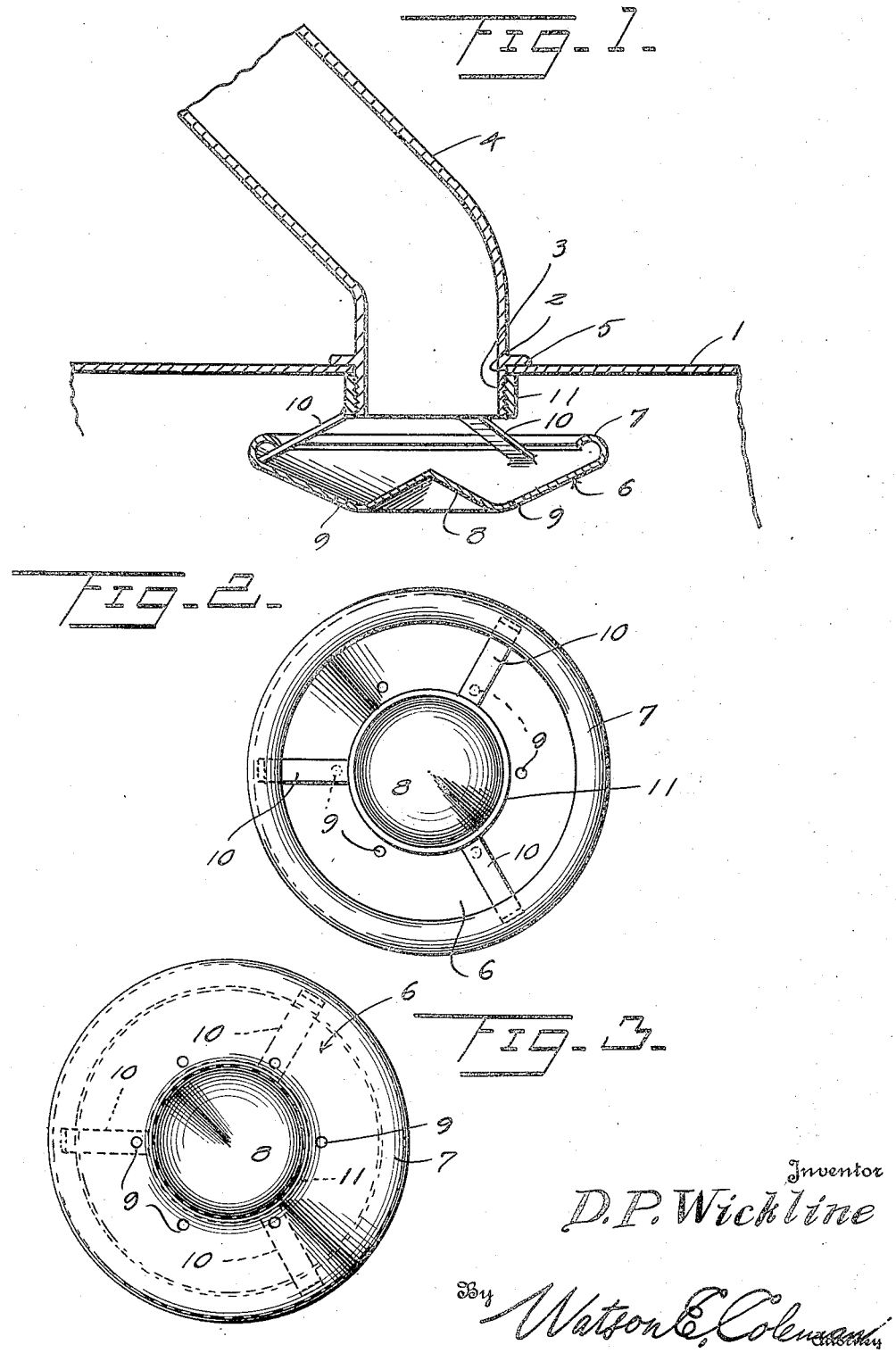

1,813,554

UNITED STATES PATENT OFFICE

DAVID P. WICKLINE, OF LYNCHBURG, VIRGINIA

THEFT PREVENTER FOR TANKS.

Application filed May 23, 1929. Serial No. 365,432.

This invention relates to safety devices for tanks more especially devices for use in connection with automobile gasoline tanks.

The primary object of this invention is to provide an attachment for a gasoline tank which will prevent a person introducing a hose thereinto for the purpose of extracting the gasoline therefrom.

Another object of the invention is to provide a device of the above described character which will be efficient and which will at the same time permit gasoline to be freely discharged into the tank when the same is filled.

A further object of the invention is to provide a device which is of simple and inexpensive construction and which may be easily secured in place.

The invention will be best understood from a consideration of the following detailed description taken in connection with the accompanying drawing forming a part of the present invention, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 shows in section a portion of a tank showing the application thereto of the device embodying the present invention.

Figure 2 is a plan view of the theft preventing device.

Figure 3 is a bottom plan view of the device.

Referring more particularly to the drawing, the numeral 1 indicates a portion of a tank through the wall of which the usual opening 2 is formed for the introduction of liquid. Extending through the opening of the tank is the threaded end 3 of a filling nozzle 4 of the type constituting a permanent part of a majority of automobile tanks at present in use, this threaded end being provided with a collar 5 which engages the wall of the tank to which it may be secured by welding or in any other suitable manner.

Arranged within the tank body is the device embodying the present invention which device comprises a relatively shallow pan 6 preferably of circular formation and having the edge thereof provided with a relative wide inturned roll 7. The central portion of the bottom of this pan 6 is pressed upwardly to form a cone 8 and about the base of the cone the wall of the pan is provided with a series of apertures 9.

Secured to the wall of the pan adjacent the rolled edge thereof is a series of inwardly and upwardly extending arms 10, the convergent inner ends of which are secured to an internally threaded collar 11. This collar 11 is adapted to threadably receive the threaded extending end 3 of the filling tube 4 in the manner shown.

The angle at which the arms 10 are set with respect to the plane in which the top of the pan lies is such that sufficient space will be provided between the inlet end of the tube 4 and the top of the pan to permit gasoline to enter the tank freely but will prevent the introduction of a tube into the tank through the inlet pipe, the lower edge 7 of the pan further preventing the tube from being turned to slip over the edge.

From the foregoing description it will be readily seen that with a device of the character herein described attached to a gasoline tank, the unauthorized removal of gasoline therefrom will be prevented.

Having thus described my invention, what I claim is:—

1. The combination with a liquid tank having an inlet opening, of a relatively shallow pan arranged within the tank in spaced relation to said opening to cover the same, said pan having its edge rolled inwardly to prevent the passage thereover of a tube inserted into the opening.

2. The combination with a liquid tank having an inlet opening and an inlet tube extending therethrough, of a pan-like body shielding the inlet end of said tube and held in spaced relation thereto, and means about the rim of said pan for preventing the end of a hose being slipped thereover.

3. The combination with a liquid tank having an inlet opening and an inlet tube extending therethrough, of a pan-like body shielding the inlet end of said tube and held in spaced relation thereto, and means about the rim of said pan for preventing the end of a hose being slipped thereover, said pan having the central portion thereof pressed upwardly to form a rigid spreading cone and further having drain apertures formed therethrough about the base of said cone.

4. The combination with a fuel tank having an inlet opening and an inlet tube extending into said tube and having threads upon its inner end, of a pan-like shield arranged beneath the inlet end of said tube, means connecting said pan with the tube for maintaining the pan in spaced relation thereto, said pan having its edge turned to provide a relatively wide inturned roll, and an upstanding rigid spreading cone formed at the bottom of the pan and directed toward the inlet tube, said pan bottom having drain apertures therethrough about the base of the cone.

5. The combination with a fuel tank having an inlet opening and an inlet tube extended thereinto and having its inner end threaded over a pan shield disposed beneath the inlet end of the tube, inwardly and upwardly converging arms carried by the pan, a threaded collar having the converging end of the arms attached thereto and threadably engaging about the tube, said pan having its edge rolled inwardly, and means in the lower portion of the pan for spreading fluid directed thereagainst from the tube.

In testimony whereof I hereunto affix my signature.

DAVID P. WICKLINE.